United States Patent [19]

Nilsson

[11] Patent Number: 4,686,040

[45] Date of Patent: Aug. 11, 1987

[54] DISC FILTER ELEMENT FOR A ROTATABLE DISC FILTER

[76] Inventor: Bjarne Nilsson, Nygatan 18C;, S-462 00 Vänersborg, Sweden

[21] Appl. No.: 830,793

[22] Filed: Feb. 19, 1986

[30] Foreign Application Priority Data

Feb. 20, 1985 [SE] Sweden .............................. 8500826

[51] Int. Cl.⁴ ............................................. B01D 33/26
[52] U.S. Cl. .................................... 210/331; 210/486
[58] Field of Search ............... 210/330, 331, 486, 327, 210/322, 324, 232

[56] References Cited

U.S. PATENT DOCUMENTS 3,643,803  2/1972  Glos .................................... 210/331

Primary Examiner—Frank Sever
Attorney, Agent, or Firm—Pollock, Vande Sande & Priddy

[57] ABSTRACT

To adapt a disc filter element of a rotatable disc filter to varying flow conditions the fluid tight filter element body (11,12) is provided with openings (34-39) the number of which is increased with increasing flow capacity through the filter means (17) of the filter element. Also, with increasing flow capacity the openings of the increasing number of openings are located at increasing distances from the vacuum connection (29) of the filter element. In order to prevent filtrate from entering portions of the interior of the filter element body beyond the most distant opening (39), as seen from the vacuum connection (29), such portions of the interior space of the filter element body are sealingly shut off from the remainder of the interior space.

7 Claims, 5 Drawing Figures

4,686,040

DISC FILTER ELEMENT FOR A ROTATABLE DISC FILTER

FIELD OF THE INVENTION

The present invention concerns a disc filter element for a rotatable disc filter of the kind where filtrate is sucked through a filter means spaced from a fluid-tight filter element body, said filter element body being provided with a plurality of openings connecting the space between the filter means and the filter element body with the interior of the latter, said interior being in communication with means for connecting the disc filter element to vacuum and to discharge filtrate therefrom.

BACKGROUND OF THE INVENTION

A disc filter element of this general kind is known from GB-A-894 318. The openings provided in the filter element body thereof are arranged to provide optimum distribution of suction during filtering and of compressed air for removing the filter cake.

Different fiber types provide most different flows through the filter. Thus, e.g. pure cellulose (long fibers) passes through typically 400 l/m² min, whereas mechanical pulp typically passes through only 40 l/m² min.

To adapt a filter of the known kind to different filtering tasks (fiber or suspension types) is expensive as well as technically complicated.

SUMMARY OF THE INVENTION

The object of the present invention is to provide a filter element which in its basic structure is more or less standardized and which by simple means can be adapted to particular flow requirements. Also, the element is designed to prevent re-wetting of the filter cake when the vacuum is released.

By means of the invention, adaptation to different flows is achieved by discharging filtrate from the space between the filter means and the filter element body into the interior of the latter, at locations where that is necessary, and by preventing filtrate from entering the inactive portion of the interior of the filter element body.

When manufacturing a filter for long fibers, i.e., great flow, there is a need for great flow capacity, and, thus, relatively many openings must be arranged in the filter body, and the first opening or openings must be arranged early in the direction of flow. If, on the contrary, a filter is to be adapted to small flows, relatively few openings can be arranged further downstream in the direction of flow, i.e., a relatively great part of the filter body can be unperforated.

BRIEF DESCRIPTION OF THE DRAWINGS

The invention will now be described with reference to the accompanying drawings, wherein an embodiment of the invention is shown for purposes of illustration, and wherein.

DETAILED DESCRIPTION OF THE PREFERRED EMBODIMENT

Figure 1:
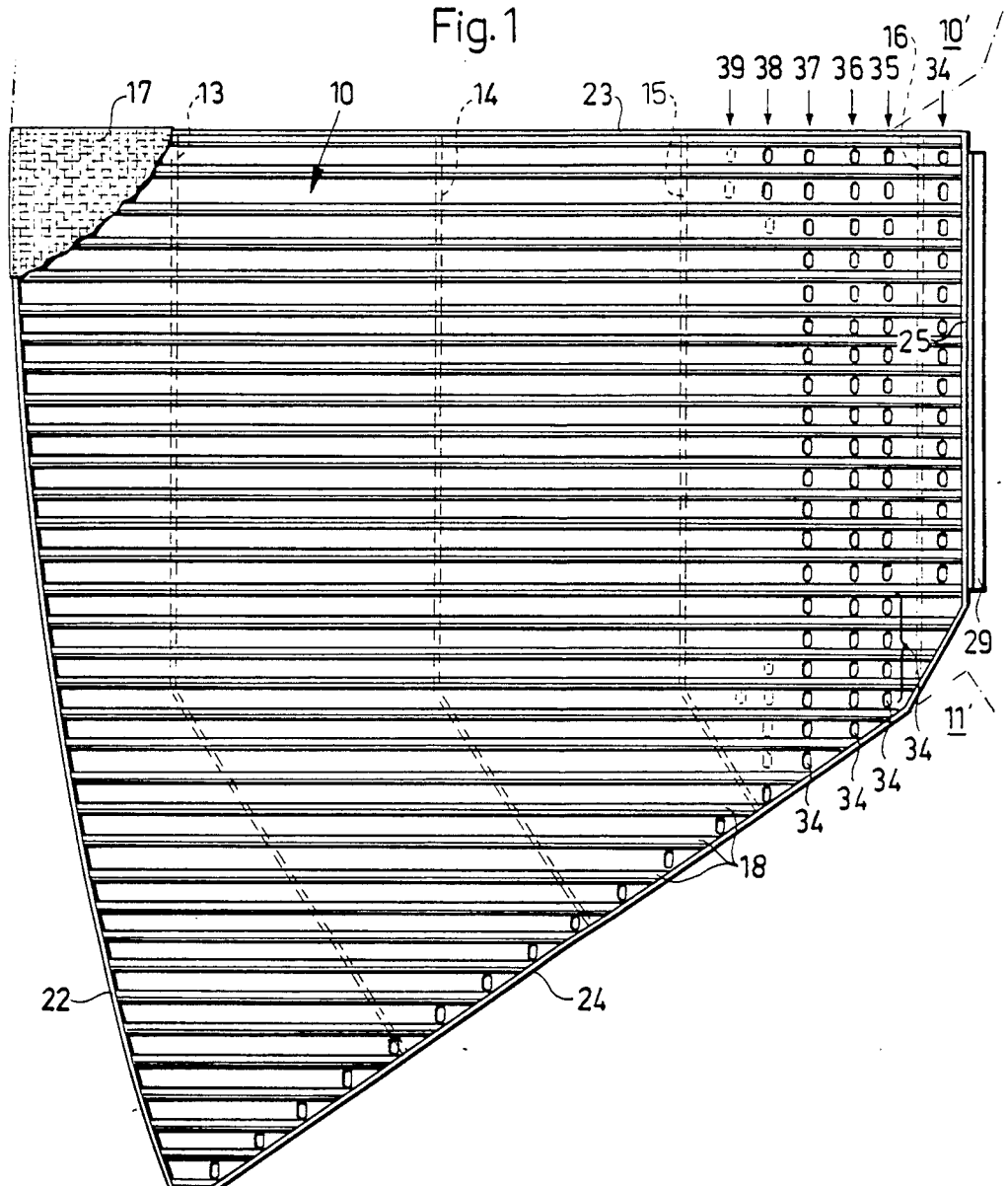
FIG. 1 shows a filter element according to the invention with a partly cut-away cloth screen.
Figure 2:
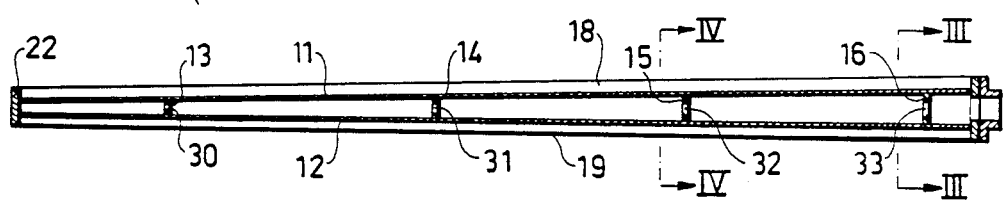
FIG. 2 shows a substantially radial section through the filter element of FIG. 1.
Figure 3:
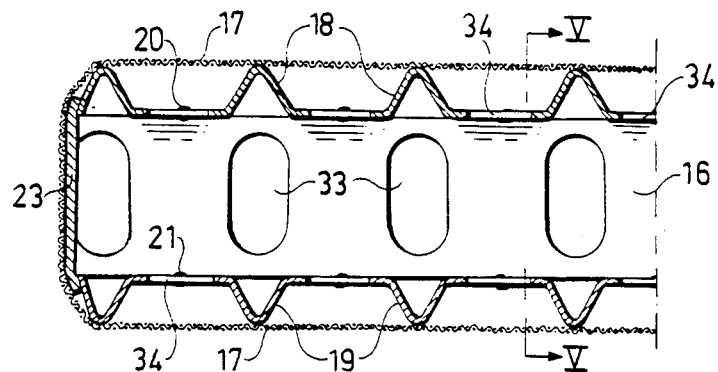
FIG. 3 shows, in a larger scale, a section taken along line III—III of FIG. 2.
Figure 4:
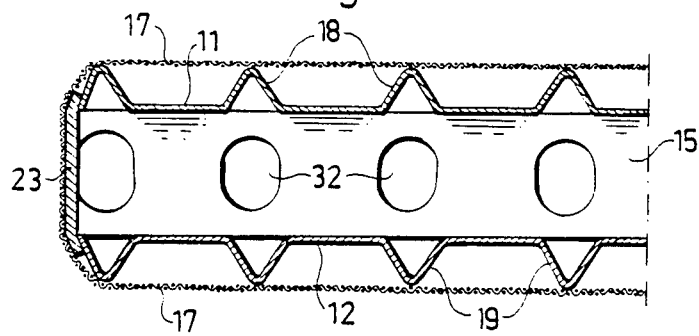
FIG. 4 shows, in the same scale as FIG. 3, a section taken along line IV—IV of FIG. 2.
Figure 5:
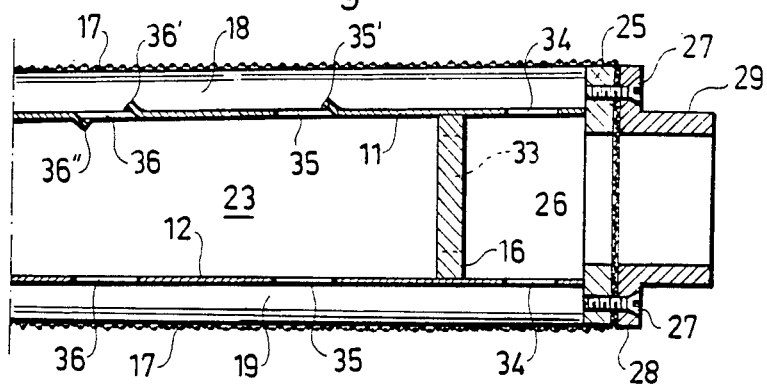
FIG. 5 shows a section taken along line V—V of FIG. 3.

As is known in the art of rotating disc filters, each filter disc comprises several, somewhat circular sector shaped filter elements which together form a circular or, rather, annular filter disc. Such an element 10 according to the invention, which is adapted for suction at its center, is shown in FIGS. 1 and 2. At 10' and 10", respectively, adjacent equal elements are indicated in dash-dotted lines. The element 10 comprises two shells 11 and 12 of fluid-tight material. The shells 11 and 12 are kept spaced from each other by a plurality of spaced spacing ribs 13, 14, 15 and 16, which have increasing height in the direction of suction, such that a cross sectional area increasing in that direction is obtained. The shells 11 and 12 are provided with means for keeping a cloth screen 17 spaced from the shells. In the embodiment shown in the drawings such means are ridges 18, 19 formed in the shells. In the areas between the ridges 18, 19, the shells 11, 12 are attached to the ribs 13–16 e.g., by spot welding if the shells and the ribs are made of, e.g., stainless steel, or by glueing if a synthetic material is used. Some spot welds 20, 21 are indicated in FIG. 3. Radially outwardly the filter element is terminated in an arcuate strip 22, which tightly connects to the shells 11, 12, including the ridges 18, 19 thereof (FIG. 2). The radial or substantially radial sides of the element are terminated in a similar way by strips 23, 24, which are shaped such that they partly grip over the ridges 18, 19 of the shells 11, 12 (FIGS. 4 and 5). Radially inwardly the element is terminated by a plate 25, which tightly connects to the shells 11 and 12 as well as to the ends of the ridges 18 and 19. Through the plate 25 extends an opening 26 which is in communication with the space between the shells 11 and 12. The cloth screen 17 is arranged about the filter element now described, and by means of screws 27 its radially inner, open end is clamped between the plate 25 and the flange 28 of a connection piece 29, which is adapted to be connected to a screen rotor, such that the filter element is carried by the rotor and such that the connection piece communicates with a suction conduit for filtrate included in the rotor.

The spacing ribs 13 to 16 are provided with openings 30, 31, 32 and 33, respectively, having areas increasing towards the radially inner end.

In the bottoms between the ridges 18, 19, the shells 11, 12 are provided openings 34, the number and location of which, as stated above, may vary according to the actual operational case.

There can be established, thus, a first extreme case, where each channel between the ridges 18, 19 has only one opening 34 closest to the connection piece 29. In this case, which, according to the foregoing, is a case of minimal flow, all filtrate transport takes place on the outside of the shells 11, 12 up to the openings 34. With increasing flow capacity through the cloth screen 17 and the filter cake deposited thereon, there is a need for a corresponding increase in flow capacity for filtrate. This increase is achieved, in accordance with the invention, in that more openings 35, 36, etc. are arranged at increasing distances from the connection piece 29. In FIG. 1, at the top, are marked four rows of openings 34, 35 . . . 39. It should be noted, however, that the four lowermost openings of the row 35, as well as the last openings of the rows 36, 37 and 38, are designated 34, since these openings are those along the respective channel between the ridges 18, 19 located closest to the connection piece. In a second extreme case for maximum flow, substantially the entire shell surfaces are provided with openings. Between the two extreme cases different groupings of openings can exist, e.g., the rows 34 to 37 shown and similar arrangements of openings in the vicinity of the spacing rib 14 and possibly also at the spacing rib 13.

In order to prevent the interior of the filter element being filled with filtrate radially outwardly of the outermost openings, which may lead to re-wetting of the filter cake when the vacuum is released, according to the invention this space is shut off against the remainder of the interior of the element. This can be achieved by filling the space in question with a suitable compound, preferably a sealing compound, and/or by making the space fluid tight in any other way. In a filter element according to FIG. 1 having rows of openings 34 to 39, e.g., the spacing rib 15 could be replaced or completed by means tightening against the space radially outwardly thereof, and/or this space could be filled with a filling compound. Naturally, provisions must then be made to establish communication also with the openings inwardly of the strip 24. In an industrial disc filter, a measure of this kind may result in that 2 m³ water per revolution are not sucked in and, as a consequence, cannot re-wet the filter cake when the vacuum is released. As an alternative to the continuous ridges shown the cloth screen may, as mentioned, be kept spaced from the shells 11, 12 by, e.g., interrupted ridges or other limited bulges in the shells that allow flow across the shell surface in directions other than the positively radial directions of the example shown.

The openings 34, etc., in the shells 11, 12 may have any suitable shape, such as oval (FIG. 1) or circular or semi-circular. Moreover, the openings may be provided with means for guiding the flow into the interior of the element. Examples of such means are shown in FIG. 5, where the downstream edges 35' and 36' of the openings 35 and 36 of the upper shell 11 have been bent upwards. In addition, in the opening 36 the opposite edge 36" is bent down.

Further, the openings 34, etc., may be relatively displaced between the shells 11 and 12, such that the flow from one opening does not meet a counter-directed flow.

I claim:

1. In a rotatable disc filter, a disc filter element, filter means (17) through which filtrate is suctioned, said filter means being spaced from a fluid-tight filter element body (11, 12) having a plurality of openings (34-39) connecting a space between said filter means (17) and said filter element body (11, 12) with the interior of said filter element body, said interior communicating with a connection means (29) for connecting said disc filter element to vacuum and to discharge filtrate therefor, the improvement comprising a number of said openings (34-39) in said filter element body (11, 12) determined as a function of the flow capacity through said filter means (17) in a given filtering task, said number of openings so determined being so positioned that, at the lowest flow capacity, all openings (34) are positioned adjacent said connection means (29), and at increasing flow capacity, further openings (35, 36, . . . 39) are positioned at increasing distances therefrom, and means for shutting off a portion of the interior of said filter element body located beyond the most distant opening, as seen from said connection means (29), from the remainder of the interior of said filter element body so as to prevent filtrate from entering said portion, said remainder being in communication with said connection means (29).

2. A disc filter element according to claim 1, wherein said portion is shut off from said remainder by means (13-16) spacing opposed faces of said filter element body (11, 12).

3. A disc filter element according to claim 1 or 2, wherein said shut-off portion of the interior of said filter body is filled with a compound.

4. A disc filter element according to claim 3, wherein said compound is a sealing compound.

5. A method comprising adapting a rotatable disc filter to a given filtering task, said filter being of the type in which filtrate is suctioned through a filter means (17) spaced from a fluid-tight filter element body (11, 12), said filter element body (11, 12) being provided with a plurality of openings (34-39) connecting a space between said filter means (17) and said filter element body (11, 12) with the interior of the latter, said interior communicating with a means (29) for connecting said disc filter element to vacuum to discharge filtrate therefrom by,
  (a) determining the number of said openings (34-39) in said filter element body (11, 12) as a function of the flow capacity through said filter means (17) in said given filtering task;
  (b) positioning said openings of said number of openings so determined so that at the lowest flow capacity, all openings (34) are positioned adjacent said connection means (29) and at increasing flow capacity, further openings (35, 36, . . . 39) are positioned at increasing distances therefrom;
  (c) shutting off a portion of said interior of said filter element body located beyond the most distant opening, as seen from said connection means (29), from the remainder of said interior of said filter element body so as to prevent filtrate from entering said portion.

6. The method according to claim 5, comprising the step of filling said shut-off portion of the interior of the filter body with a compound.

7. The method according to claim 6, wherein said compound is a sealing compound.

* * * * *